United States Patent [19]

Lenhart et al.

[11] Patent Number: 5,652,073
[45] Date of Patent: Jul. 29, 1997

[54] BIPOLAR CELL DESIGN FOR A GAS DEPOLARIZED BATTERY

[75] Inventors: Stephen John Lenhart, Mountain View; Carl R. Halbach, Palo Alto; John C. Hall, Saratoga, all of Calif.

[73] Assignee: Space Systems/Loral, Inc., Palo Alto, Calif.

[21] Appl. No.: 626,992

[22] Filed: Apr. 3, 1996

[51] Int. Cl.$^6$ .................................................. H01M 6/46
[52] U.S. Cl. ............................................ 429/210; 429/154
[58] Field of Search .................................. 429/154, 155, 429/210, 185, 174, 152, 153

[56] References Cited

U.S. PATENT DOCUMENTS

| | | | |
|---|---|---|---|
| 5,162,172 | 11/1992 | Kaun | 429/155 |
| 5,254,415 | 10/1993 | Williams et al. | 429/153 |
| 5,395,706 | 3/1995 | Hall | 429/50 |
| 5,395,708 | 3/1995 | Hall | 429/120 |
| 5,578,394 | 11/1996 | Oweis et al. | 429/155 |

*Primary Examiner*—M. Nuzzolillo
*Attorney, Agent, or Firm*—Perman & Green

[57] ABSTRACT

A bipolar rechargeable battery comprises a vessel with an insulated liner and an interior region for bulk storage of a gas which serves as an electrode active material. A plurality of cells are nested within the vessel, each including a metallic bipolar cup having a circular base and an integral insulated hydrophobic upstanding side wall of truncated conical shape diverging with increased distance from the base. A positive electrode overlies the base. A dielectric separator separates the positive electrode and a negative electrode sized to fittingly engage the side wall such that any gas generated at the positive electrode must pass through the negative electrode to escape the cell to thereby recombine the generated gas with the active material gas within the cell. The upstanding side wall of each cell is oriented to enable gas passage from each of said cells to the bulk gas storage region. The upstanding side walls of the adjacent cells mutually define a gap enabling gas communication between the adjacent cells and between each of the cells and the bulk gas storage region. A gas screen of porous conductive inert material may overlie the gas electrode, providing an interface between the cell and an adjoining cell in the battery and passage of gas between the bulk gas storage and the gas electrode current collector.

17 Claims, 3 Drawing Sheets

BIPOLAR CELL DESIGN FOR A GAS DEPOLARIZED BATTERY

BACKGROUND OF THE INVENTION

1. Field of the Invention

The present invention relates to the design of a bipolar cell for gas depolarized rechargeable batteries such as nickel hydrogen and zinc oxygen.

2. Discussion of the Prior Art

A vexing problem with bipolar batteries is the need for an electrolyte seal between individual cells to prevent battery short circuits. This problem is exacerbated in batteries with a gas phase active material as communication to a common gas storage space must be provided. Thus both a liquid seal and a gas vent are required.

An additional problem with these batteries is that means must be found to prevent gas phase water transfer between cells either as water vapor or as a result of parasitic reactions which generate oxygen in the case of a nickel hydrogen battery or hydrogen in the case of a zinc oxygen battery. If the parasitic gases are transported to the bulk vapor space then they may preferentially recombine with the depolarizing gas in those cells closest to the gas space. For example, $O_2$ generated during nickel electrode overcharge in a nickel hydrogen cell may react with hydrogen within the cell or be transported out of the cell and react in the gas storage vessel or in another electrode. $O_2$ lost from the cell may be converted to $H_2O$ in other cells or other parts of the battery. This leads to "dry out" and failure of the cell from which $O_2$ is lost.

SUMMARY OF THE INVENTION

It was in light of the foregoing that the present invention was conceived and is now hereby reduced to practice. Thus, a bipolar rechargeable battery comprises a vessel with an insulated liner and an interior region for bulk storage of a gas which serves as an electrode active material. A plurality of cells are nested within the vessel, each including a metallic bipolar cup having a circular base and an integral insulated hydrophobic upstanding side wall of truncated conical shape diverging with increased distance from the base. A positive electrode overlies the base. A dielectric separator separates the positive electrode and a negative electrode sized to fittingly engage the side wall such that any gas generated at the positive electrode must pass through the negative electrode to escape the cell to thereby recombine the generated gas with the active material gas within the cell. The upstanding side wall of each cell is oriented to enable gas passage from each of said cells to the bulk gas storage region. The upstanding side walls of the adjacent cells mutually define a gap enabling gas communication between the adjacent cells and between each of the cells and the bulk gas storage region. A gas screen of porous conductive inert material may overlie the gas electrode, providing an interface between the cell and an adjoining cell in the battery and passage of gas between the bulk gas storage and the gas electrode current collector.

The cell components for a gas depolarized battery according to the invention comprise a condensed phase electrode, a separator, a gas electrode and a gas screen. The condensed phase electrode may, for example, be active $Ni(OH)_2$ deposited in a microporous nickel electrode (e.g., in a nickel hydrogen battery) or a microporous zinc electrode (e.g., a zinc oxygen battery). The separator is typically a porous insulator such as $ZrO_2$ cloth, asbestos, glass paper, porous plastic, and the like, which acts to electrically insulate the opposing electrodes but allows ionic conduction between the electrodes via the liquid electrolyte solution which fills the pores of the separator.

In the gas electrode the gas phase active material is in intimate contact with a liquid phase electrolyte solution and a high surface area-electrically conductive-solid phase-catalytic gas electrode surface. In operation there must be free communication between the gas electrode and the bulk gas phase so that gaseous active material may be consumed in discharge or stored during charge. This communication is provided within the cell by the gas screen which is positioned on the back side of the gas electrode.

The key elements of the invention comprise a metallic electrode cup or dish the conical side walls of which are insulated with a hydrophobic material such as PTFE marketed by E.I. dupont de Nemours Company of Wilmington, Del. under the registered trademark Teflon®. The base of the cup is uncoated and acts at the conductive bipolar cell interconnect. The insulated side walls prevent shorting between series connected cells when the cups are nested to form a battery as shown in FIG. 1. The insulation also prevents shorting between the gas and condensed phase electrodes of each cell. The draft angle of the side walls relative to the base is selected such that when cells are nested there is a gap between successive side walls which allows gas communication between the cell and the bulk gas storage volume.

In the present invention electrolyte solution migration between cells is prevented by the side walls of the cup, the hydrophobic coating on the side walls and an electrolyte starved design. In a vertical orientation gravity will prevent intercell electrolyte bridging. With an electrolyte starved design, the microporosity of the electrodes and separator act to further prevent electrolyte bridging particularly when the battery is in a non vertical orientation or in a zero-g gravitational environment. Finally, bridging by an electrolyte film is prevented by the hydrophobic coating.

A second issue with bipolar gas depolarized batteries is gas management of parasitic cell reactions. The overcharge reaction at the $Ni(OH)_2$ electrode in a nickel hydrogen cell is:

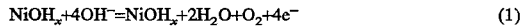

$$NiOH_x + 4OH^- = NiOH_x + 2H_2O + O_2 + 4e^- \qquad (1)$$

Similarly, the charged zinc electrode in a zinc oxygen cell will generate hydrogen through its parasitic reaction with aqueous electrolyte, as follows:

$$Zn + H_2O = ZnO + H_2 \qquad (2)$$

The parasitic gases generated in both reactions will react with the gaseous active material (hydrogen and oxygen, respectively) to produce water. If the parasitic gases generated by the above reactions escape the cell the water formed by recombination may be condensed outside the bipolar cell. The loss of water will tend to dry the cell out leading ultimately to cell failure.

A second feature of the present invention is that it inhibits loss of water from bipolar cells due to parasitic reactions such as (1) and (2). This is accomplished by:

(a) positioning the gas electrode above the condensed phase electrode within the bipolar electrode cup; and (b) extending the gas electrode beyond the edge of the condensed phase electrode and sizing the gas electrode such that there is essentially an interference fit between it and the side walls of the cup.

The effect of these two features is that any parasitic gas generated at the condensed phase electrode must pass through the gas electrode in order to escape the cell. The catalytic gas electrode will preferentially recombine the gas with the active material gas within the cell.

Accordingly, it is a primary object of the invention to provide an improved bipolar cell for gas depolarized rechargeable batteries such as nickel hydrogen and zinc oxygen.

Another object of the invention is to provide a bipolar electrode structure based on a conductive cup with insulated hydrophobic conical side walls which act to (a) insulate the cell from adjacent cells and (b) impede the exchange of electrolyte solution between cells.

A further object of the invention is to provide such a bipolar battery with conical or cup-shaped electrodes assembled in a nested fashion.

Still another object of the invention is to provide such a gas depolarized battery in which the draft angle of the conical side walls is such that a gas passage exists between series cells.

Yet another object of the invention is to provide such a bipolar battery in which the gas electrode is positioned above the condensed phase electrode in the cup, with its edges extending to the inner diameter of the cup in order to prevent the escape of gas from the cell generated at the condensed phase electrode by parasitic reactions.

Still a further object of the invention is to apply the foregoing concepts to rechargeable gas depolarized batteries which include nickel hydrogen, silver hydrogen, zinc oxygen, cadmium oxygen and iron oxygen.

Yet a further object of the invention is to provide such a battery construction with a bipolar cup structure wherein the metallic cup is preferably nickel although titanium may be used, and the insulator is, for example, a hydrophobic insulator such as Teflon®.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

Figure 1:
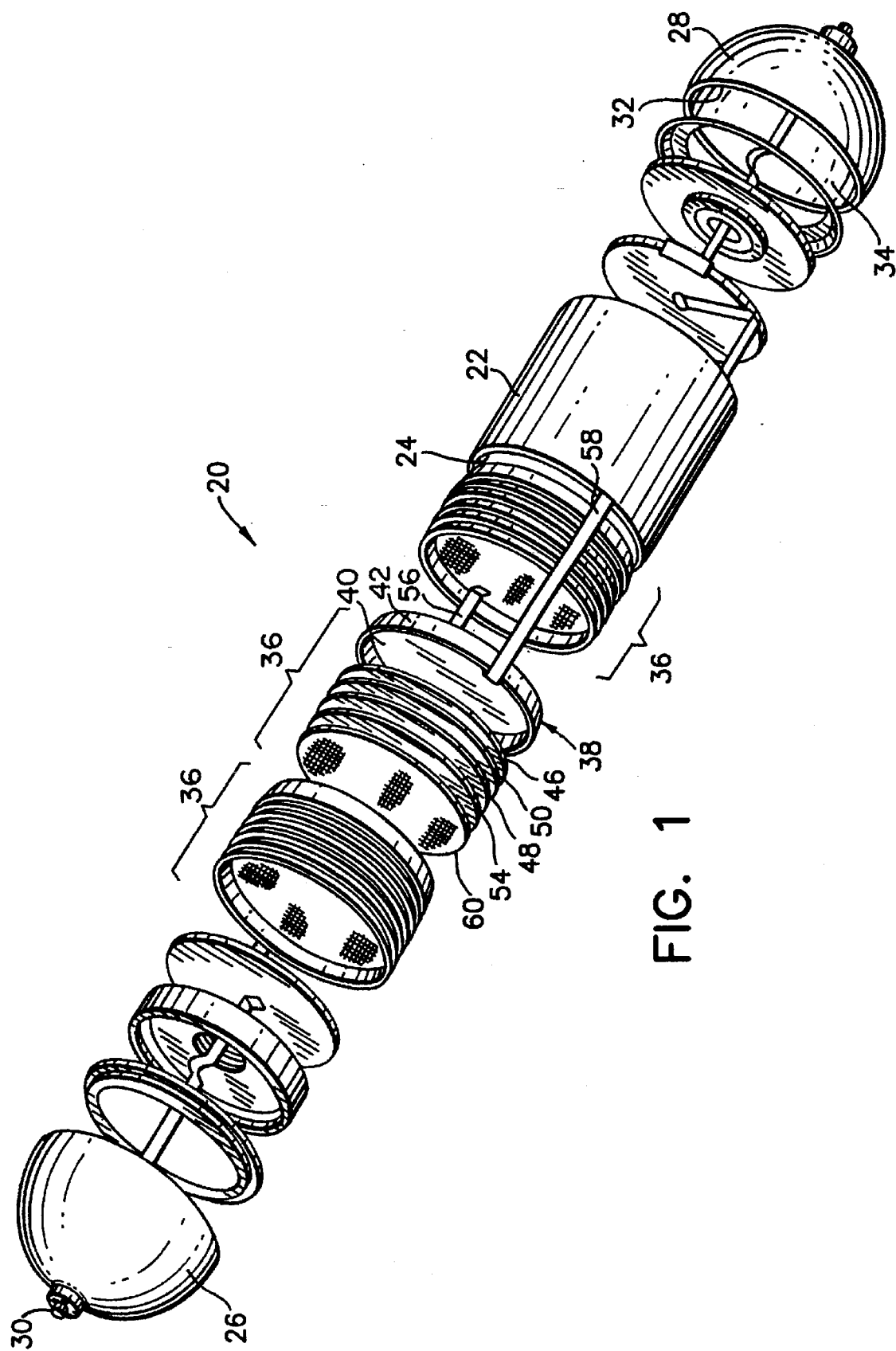
FIG. 1 is a perspective exploded view of a battery embodying the present invention.

Turn now to the drawings and, initially, to FIG. 1 which illustrates in exploded fashion a bipolar rechargeable battery 20 embodying the present invention. The battery 20 may be, for example, of the bipolar nickel hydrogen variety. A vessel for the battery is defined by a central cylinder 22 which may be coated with a Teflon® liner 24 (see FIG. 2) and opposed, possibly spherical, end caps 26, 28 which may be drawn together into firm engagement with opposed end rims of the central cylinder by means of a suitable fastener. Together, the central cylinder 22 and the end caps 26, 28 provide an inner surface 32 defining an interior region 34 for bulk gas storage as will be described. With this construction, the battery 20 is capable of withstanding such pressures as are generated by the contained gases.

Figure 2:
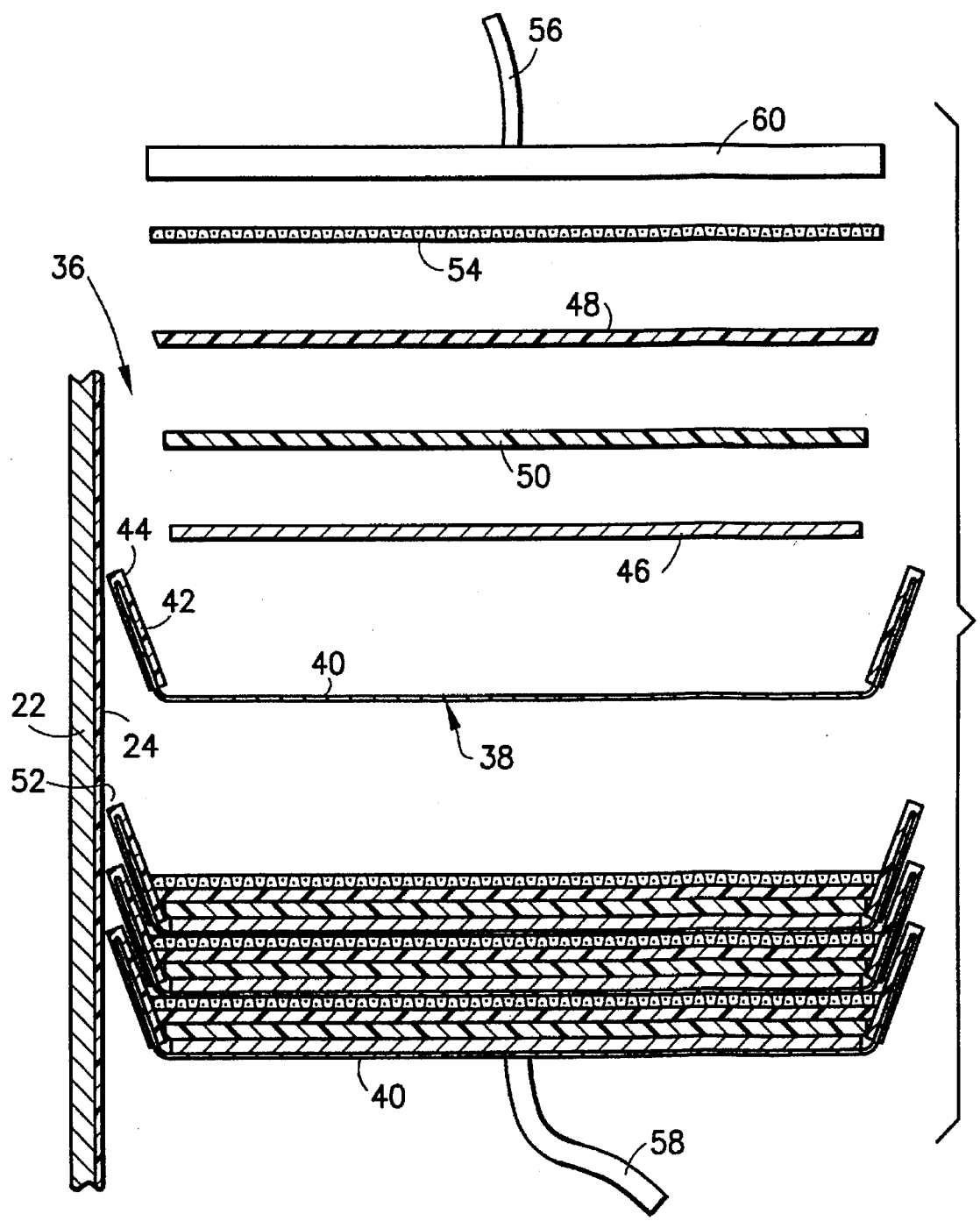
FIG. 2 is a diagrammatic cross section view, partially exploded, illustrating the construction of a plurality of bipolar cells utilized in the battery of FIG. 1.

Viewing FIGS. 1 and 2, a plurality of cells 36 are suitably mounted within the vessel, specifically within the central cylinder 22 in a nested relationship. Each cell 36 contains a metered predetermined quantity of electrolyte and includes a metallic bipolar cup 38 having a base 40 and an integral upstanding side wall 42 encompassing the base. Preferably the upstanding side wall is of truncated conical shape diverging with increased distance from the base, although other shapes are within the scope of the present invention including the side wall 42 being substantially coplanar with the base 40. An insulating material 44 covers the upstanding side wall 42.

The metallic bipolar cup 38 may be fabricated from a variety of materials including nickel, aluminum plated with nickel, stainless steel, metallic coated graphite composite and titanium. A preferred side wall coating is a hydrophobic fluorocarbon such as Teflon®.

A condensed phase electrode 46 is positioned proximate the base. The condensed phase electrodes typically used for the purposes of the present invention are typically 84% porous 0.1 cm thick sintered nickel supported on a nickel screen and electrochemically loaded to between 1.0 and 2.5 g/cm$^3$ of void volume with active Ni(OH)$_2$. This is a standard aerospace positive electrode although it is understood that a variety of nickel positive electrodes could be employed. In particular a sintered nickel electrode without a support screen would be preferred as the screen is not needed for current conduction in a bipolar battery.

Overlying the condensed phase electrode 46 is a gas electrode 48 including a condensed current collector for a gaseous active material. The gas electrode is typically platinum powder or platinized carbon powder bonded with Teflon® and supported on carbon cloth or expanded metal. The gas electrode must be conductive through its thickness and, to this end, has no hydrophobic wet proofing porous Teflon® layer. Back side hydrophobicity is still required in order that the electrolyte not flood and block a gas screen 50, to be described. This is achieved by the vendor of the gas electrode 48 using a proprietary hydrophobic carbon coating on the gas side of the electrode. It will be appreciated that the gas electrode 48 is a solid current collector for a gaseous active material and is sized to fittingly engage the side wall 42 such that any gas generated at the condensed phase electrode 46 must pass through the gas electrode to escape the cell 36 to thereby recombine the generated gas with the active material gas within the cell.

Intermediate the gas electrode 48 and the condensed phase electrode 46 is a dielectric separator 50. One form of the separator employed for purposes of the invention is ZrO$_2$ woven cloth approximately 80% porous and 0.05 cm thick. However, other suitable materials could be used to achieve a similar result. The separator acts to electrically insulate the opposing electrodes but allows ionic conduction between the electrodes via the liquid electrolyte which fills the pores of the separator.

The upstanding side walls 42 of adjacent cells 36 are oriented such that they mutually define a gap 52 enabling gas communication between the adjacent cells and between each of the cells and the interior bulk gas region 34 within the battery 20. As previously noted, an insulating liner 24 is provided on the inner surface of the vessel for assuring its fluid integrity.

Rounding out the construction of the cell 36 is a gas screen 54 of porous conductive inert material proximate the gas electrode for providing an interface between one cell and an adjoining cell in the battery 20. The gas screen 54 may be any porous conductive inert material such as nickel screen, porous nickel felt, nickel coated plastic screen, and the like. It serves the purpose of allowing shared Hz access to the entire face of the gas electrode and provides electrical conductivity between adjacent cells.

Each cell 36 is assembled by laying the components up in the metallic bipolar cup in the order illustrated in FIGS. 1 and 2. Once the condensed phase electrode 46 and dielectric separator 50 are in place, sufficient electrolyte is introduced to the cup to fill between 60% and 100% of the porous volume of the condensed phase electrode and separator. The electrolyte for this battery is typically a mixture of KOH and LiOH in water with weight percent between 15% and 45% of KOH and 0% and 20% of LiOH. After electrolyte introduction, assembly is completed by laying the gas electrode 48 and gas screen 54 in the metallic cup. Battery assembly consists of repetitively stacking cells to achieve the desired cell count and battery voltage. The stacked cells are placed in the vessel defined by the central cylinder 22 and end caps 26, 28 which together constitute a pressure vessel, compressed to the design stack height, bus leads 56 (negative) and 58 (positive) from the electrodes 60, 40, respectively, are attached to the battery terminals, and the vessel closed.

EXAMPLE

Figure 3:
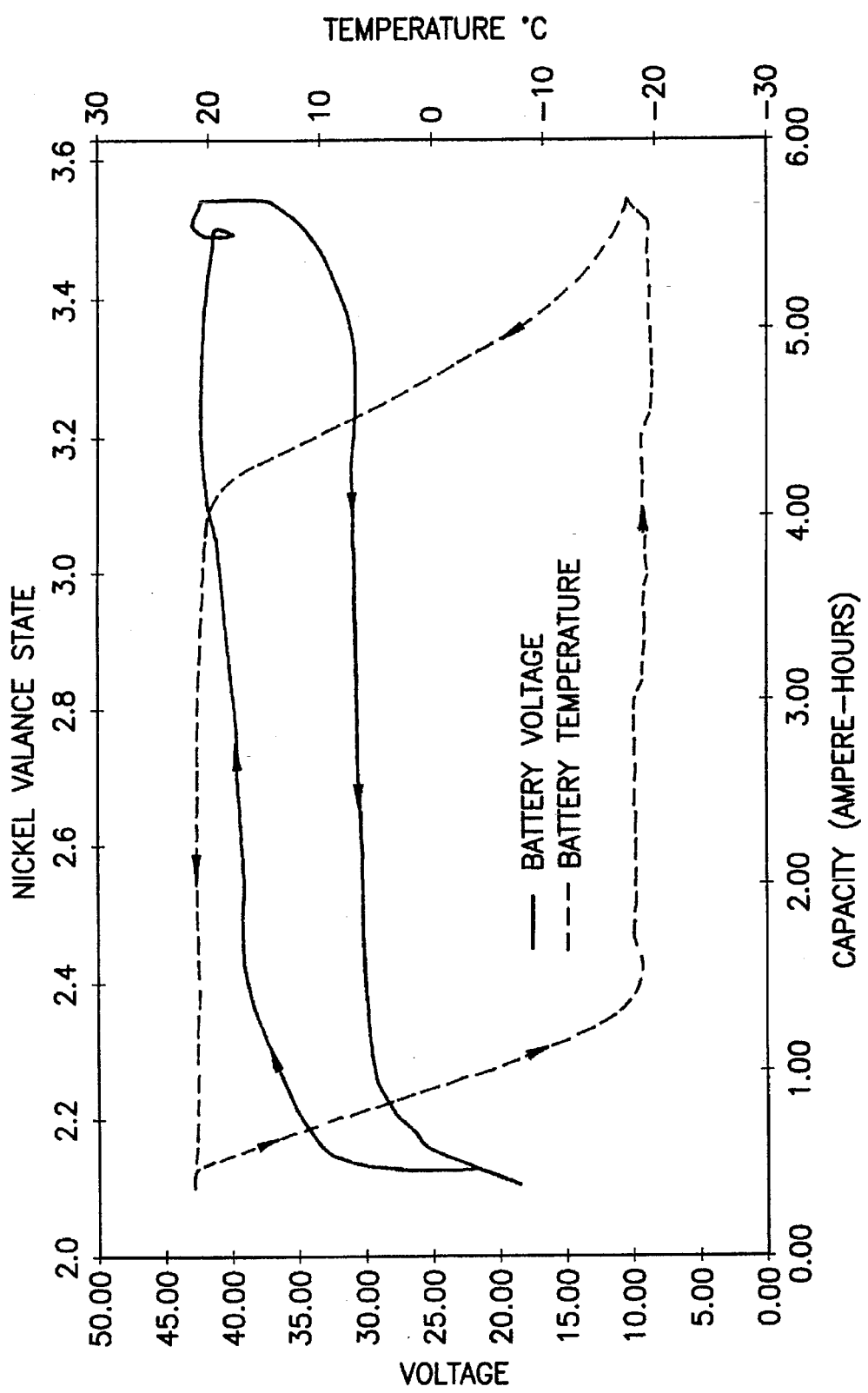
FIG. 3 is a graph depicting the operation of a battery embodying the present invention.

Typical charge discharge behavior for a battery 20 constructed according to the present invention is given in FIG. 3. For the instance depicted in FIG. 3, a battery 20 was constructed with 27 cells and had a mid discharge voltage of 30 V. When operated in the "Cold Charge" mode as described in commonly assigned U.S. Pat. No. 5,395,706, the battery reached a full charge nickel valence state of $Ni^{+3.5}$. This is essentially the same capacity as would be obtained in a conventional monopolar battery operated in the same fashion. Specifically, it is seen that battery voltage rises quickly to above 35 V, where it levels off for the remainder of the charging period. Battery temperature is reduced for the first 1.5 ampere-hours (Ah) of charging to approximately $-20°$, where it remains for the duration of the charging period. Just prior to discharge, battery capacity is boosted from about 5.5 to 5.7 Ah by stepping up the charge current. Battery charging voltage rises to about 45 V during the current pulse step, and the average nickel valence in the positive active material rises to at least $Ni^{+3.5}$. During discharge, battery voltage drops from above 40 to about 32 volts as capacity drops from about 5.7 to 4.8 Ah, and the temperature is increased to about $+20°$ C. The discharge is stopped when battery voltage drops below about 20 V.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A bipolar cell for a gas depolarized rechargeable battery comprising:

an electrically conductive bipolar base having a peripheral edge;

a hydrophobic insulating member attached to said peripheral edge;

a condensed phase electrode proximate said base;

a gas electrode including a condensed current collector for a gaseous active material; and a dielectric separator between said condensed phase electrode and said gas electrode;

said insulating member being oriented to enable gas passage from said cell past an adjoining cell to a bulk gas storage region within the battery.

2. A bipolar cell as set forth in claim 1 including:

a gas screen of porous conductive inert material proximate said gas electrode for providing an interface between said cell and an adjoining cell in the battery.

3. A bipolar cell as set forth in claim 1 wherein said gas electrode is a current collector for a gaseous active material and is sized to fittingly engage said insulating member such that any parasitic gas generated at said condensed phase electrode must pass through said gas electrode to escape said cell to thereby recombine the generated gas with the active material gas within said cell.

4. A bipolar rechargeable battery comprising:

a vessel having an inner surface defining an interior region for bulk gas storage;

a plurality of cells mounted within said vessel in a side by side relationship, each of said cells containing a metered predetermined quantity of electrolyte, each of said cells including:

an electrically conductive bipolar base having a peripheral edge;

a hydrophobic insulating member attached to said peripheral edge;

a condensed phase electrode proximate said base; and a gas electrode including a condensed current collector for a gaseous active material;

a dielectric separator between said condensed phase electrode and said gas electrode;

said insulating member of said plurality of cells being oriented to enable gas passage from each of said cells to the bulk gas region within the battery.

5. A bipolar rechargeable battery as set forth in claim 4 including:

an insulating liner on said inner surface of said vessel to prevent electrolyte solution bridging between said cells via the wall of said vessel.

6. A bipolar rechargeable battery as set forth in claim 4 including:

a gas screen of porous conductive inert material proximate said gas electrode for providing an interface between said cell and an adjoining cell in the battery and for providing gas access to said gas electrode.

7. A bipolar rechargeable battery as set forth in claim 4 wherein said gas electrode is a condensed current collector for a gaseous active material and is sized to fittingly engage said insulating member such that any parasitic gas generated at said condensed phase electrode must pass through said gas electrode to escape said cell to thereby recombine the generated gas with the active material gas within said cell.

8. A bipolar cell for a gas depolarized rechargeable battery comprising:

a metallic bipolar cup having a base and an integral upstanding side wall encompassing said base;

a hydrophobic insulating material covering said upstanding side wall;

a condensed phase electrode overlying said base;

a gas electrode including a condensed current collector for a gaseous active material; and a dielectric separator between said condensed phase electrode and said gas electrode;

said upstanding side wall being oriented to enable gas passage from said cell past an adjoining cell to a bulk gas storage region within the battery.

9. A bipolar cell as set forth in claim 8 including:

a gas screen of porous conductive inert material proximate said gas electrode for providing an interface between said cell and an adjoining cell in the battery.

10. A bipolar cell as set forth in claim 8 wherein said upstanding side wall is of truncated conical shape diverging with increased distance from said base;

whereby said upstanding side wall of said cell and an adjacent upstanding side wall of an adjacent cell together define a gap enabling gas communication between said cell and the adjacent cell and between each of said cell and the adjacent cell and a bulk gas storage region within the battery.

11. A bipolar cell as set forth in claim 8 wherein said gas electrode is a condensed current collector for a gaseous active material and is sized to fittingly engage said insulating member such that any parasitic gas generated at said condensed phase electrode must pass through said gas electrode to escape said cell to thereby recombine the generated gas with the active material gas within said cell.

12. A bipolar rechargeable battery comprising:

a vessel having an inner surface defining an interior region for bulk gas storage;

a plurality of cells mounted within said vessel in a nested relationship, each cell containing a metered predetermined quantity of electrolyte, each of said cells including:

a metallic bipolar cup having a base and an integral upstanding side wall encompassing said base;

a hydrophobic insulating material covering said upstanding side wall;

a condensed phase electrode proximate said base; and a gas electrode including a condensed current collector for a gaseous active material;

a dielectric separator between said condensed phase electrode and said gas electrode;

said upstanding side wall of said plurality of cells being oriented to enable gas passage from each of said cells to the bulk gas region within the battery.

13. A bipolar rechargeable battery as set forth in claim 12 including:

an insulating liner on said inner surface of said vessel for assuring the fluid integrity thereof.

14. A bipolar rechargeable battery as set forth in claim 12 wherein each of said upstanding side walls is of truncated conical shape diverging with increased distance from said base;

whereby said upstanding side walls of adjacent ones of said cells mutually define a gap enabling gas communication between said adjacent cells and between each of said cells and the interior region of said vessel.

15. A bipolar rechargeable battery as set forth in claim 12 including:

a gas screen of porous conductive inert material proximate said gas electrode for providing an interface between said cell and an adjoining cell in the battery and for providing gas access to said gas electrode.

16. A bipolar rechargeable battery as set forth in claim 12 wherein said battery is a nickel hydrogen battery; and wherein said vessel is a pressure vessel.

17. A bipolar rechargeable battery as set forth in claim 12 wherein said gas electrode is a solid current collector for a gaseous active material and is sized to fittingly engage said side wall such that any gas generated at said condensed phase electrode must pass through said gas electrode to escape said cell to thereby recombine the generated gas with the active material gas within said cell.

* * * * *